United States Patent [19]

Hirahara et al.

[11] Patent Number: 5,586,797
[45] Date of Patent: Dec. 24, 1996

[54] AUTOMOTIVE DOOR ASSEMBLY

[75] Inventors: Shinichi Hirahara; Hiroki Morimoto, both of Saitama-ken, Japan

[73] Assignee: Honda Giken Kogyo Kabushiki Kaisha, Tokyo, Japan

[21] Appl. No.: 508,207

[22] Filed: Jul. 27, 1995

[30] Foreign Application Priority Data

Jul. 29, 1994 [JP] Japan .................................. 6-197320

[51] Int. Cl.⁶ ........................................................ B60J 5/04
[52] U.S. Cl. .................................... 296/146.6; 296/189
[58] Field of Search ................................. 296/146.6, 189, 296/188

[56] References Cited

U.S. PATENT DOCUMENTS

| | | | |
|---|---|---|---|
| 3,936,090 | 2/1976 | Aya et al. | 296/146.6 |
| 4,451,518 | 5/1984 | Miura et al. | 296/189 X |
| 4,917,433 | 4/1990 | Tomforde | 296/146.6 X |
| 5,026,111 | 6/1991 | Hewko | 296/146.6 |
| 5,171,058 | 12/1992 | Ishikawa | 296/489 |

FOREIGN PATENT DOCUMENTS

| | | | |
|---|---|---|---|
| 3425776 | 1/1986 | Germany | 296/146.6 |
| 62-103222 | 5/1987 | Japan. | |
| 406191275 | 7/1994 | Japan | 296/146.6 |

*Primary Examiner*—Joseph D. Pape
*Attorney, Agent, or Firm*—Armstrong, Westerman, Hattori, McLeland & Naughton

[57] ABSTRACT

In an automotive door assembly including an outer panel and an inner panel, the inner panel is reinforced by a plate member attached to the outer surface of the inner panel so as to define a closed vertical cross section by a pair of mutually opposing concave surfaces thereof. The inner reinforcement member is relatively large in thickness but is allowed to relatively readily extend vertically by being relatively sharply bent at upper and lower portions thereof. Thus, according to the present invention, the automotive door demonstrates a relatively high rigidity against external side impacts, and can spread the impact energy over a large area, thereby involving a relatively small deformation. On the other hand, the door can readily deform itself against internal side impacts, and a relative large amount of impact energy can be absorbed again without involving a large lateral deformation because the collapsing and the vertical extension of the closed cross section formed by the inner panel and the associated inner reinforcement member allows a large amount of energy to be absorbed.

7 Claims, 2 Drawing Sheets

AUTOMOTIVE DOOR ASSEMBLY

TECHNICAL FIELD

The present invention relates to an automotive door assembly, and in particular to an automotive door assembly capable of favorably absorbing side impacts.

BACKGROUND OF THE INVENTION

It is known to weld a reinforcement member made of a plate member to the inner or outer panel of the automotive door so as to form a frame structure having a closed vertical cross section inside the door as disclosed, for instance, in Japanese patent laid open (kokai) publication No. 62-103222 for reinforcing the automotive door against side impacts. This conventional structure is intended as a reinforcement for minimizing lateral deformation when subjected to external side impacts.

However, this structure does not take into account any side impact which may be applied from inside the passenger compartment.

BRIEF SUMMARY OF THE INVENTION

In view of such problems of the prior art, a primary object of the present invention is to provide an automotive door assembly which is relatively rigid against external impacts so as to be capable of spreading impact energy over a wide area, but relatively readily deformable against internal side impacts so as to be capable of favorably absorbing the impact energy.

A second object of the present invention is to provide an automotive door assembly which demonstrates a favorable performance against both internal and external side impacts but can be implemented without unduly increasing the thickness of the door.

A third object of the present invention is to provide an automotive door assembly which demonstrates a favorable performance against both internal and external side impacts but can be fabricated at a low cost.

These and other objects of the present invention can be accomplished by providing an automotive door assembly, comprising: an outer panel; an inner panel opposing the outer panel, the inner panel presenting a concave surface toward the outer panel as seen in a vertical cross section; and an inner reinforcement member made of a plate member attached to an external surface of the inner panel and presenting a concave surface toward the inner panel as seen in a vertical cross section so as to jointly define a closed vertical cross section with the inner panel, the inner panel being more readily deformable than the inner reinforcement member.

Thus, the door can favorably absorb impact energy without regard to the direction of the side impact applied to the door. The inner reinforcement member can favorably spread the impact energy of an external side impact over a large area, and the inner panel can favorably absorb the impact energy in a highly efficient manner.

If the inner reinforcement member is bent relatively sharply at upper and lower pans thereof so as to define the concave surface thereof while the inner panel is curved by a relatively large radius of curvature to define the concave surface thereof, the inner reinforcement member is extended relatively readily in a vertical direction in case of an internal impact, and the inner panel is allowed to deform without involving buckling deformation. As a result, the closed vertical cross section defined by the inner panel and the inner reinforcement member can absorb the energy of the internal side impact in a highly efficient manner without involving any large lateral deformation.

In this case, the inner reinforcement member may have a larger thickness than the inner panel, and still retain its capability to readily deform in the vertical direction. Thus, the door may have a high rigidity against external side impacts. In this conjunction it is preferable if the outer panel is also reinforced by an outer reinforcement member. Preferably, an inner surface of the inner panel is covered by a layer of cushioning material so as to enhance the capability of the inner panel to favorably absorb the energy of internal side impacts.

To favorably control the vertical extension of the closed vertical cross section defined by the inner reinforcement member and the inner panel, these pans defining the closed vertical cross section may have a substantial identical vertical dimension in developed states thereof.

According to a preferred embodiment of the present invention, a window pane is guided along a vertical path between the outer panel and the inner reinforcement member, and a pan of the inner reinforcement member extending between the upper and lower sharply bent pans defines a relatively flat surface extending substantially in parallel with the vertical path of the window pane. Thus, the space inside the door is efficiently utilized, and the overall thickness of the door can be minimized.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
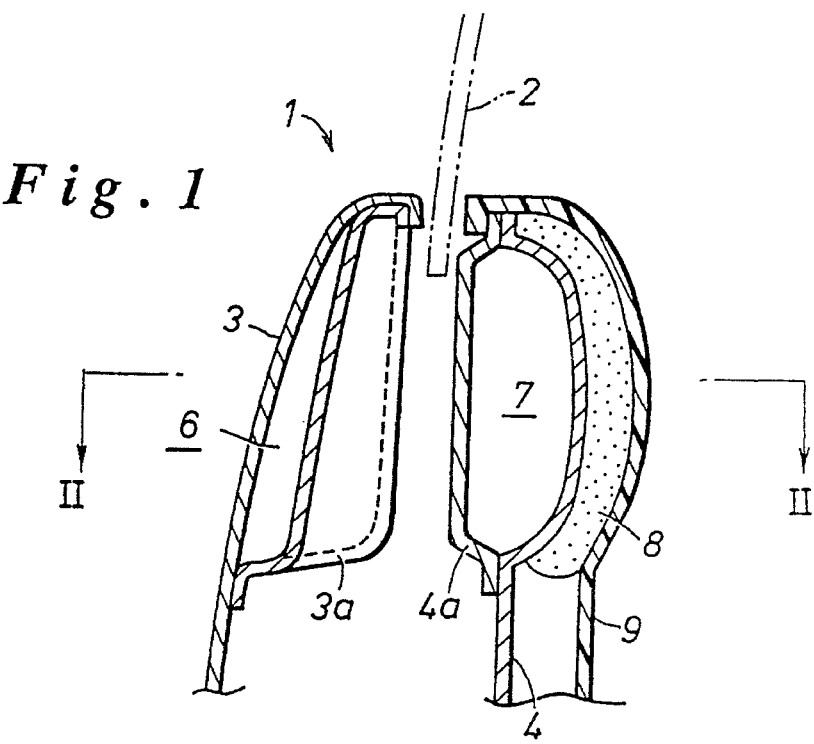
FIG. 1 is a vertical sectional view of an essential part of a preferred embodiment of the automotive door assembly according to the first embodiment.
Figure 2:
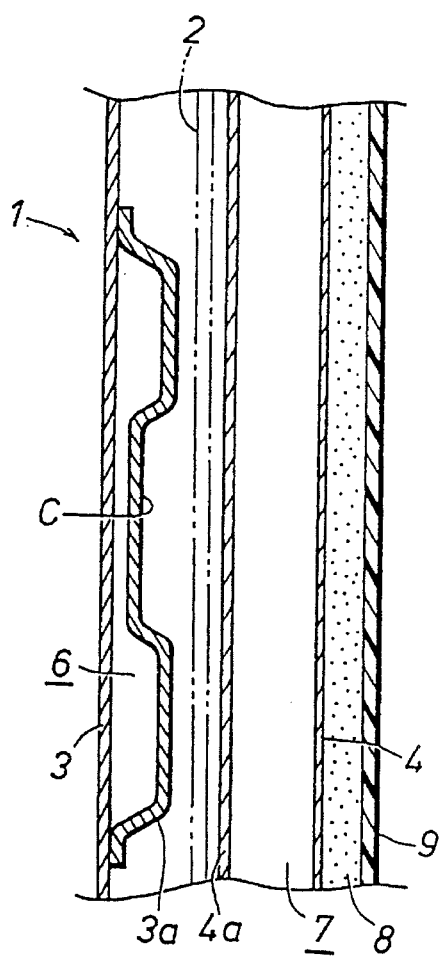
FIG. 2 is a sectional view taken along line II—II of FIG. 1.

Referring to FIGS. 1 and 2, the automotive door 1 according to the present invention comprises an outer panel 3 and an inner panel 4 which are spaced apart defining a path along which a window glass pane 2 moves vertically. Reinforcement members 3a and 4a consisting of stamp formed sheet metal members or plate members are welded to the inner surfaces of the outer panel 3 and the inner panel 4, respectively, defining a closed cross section 6 or 7 in each case.

The outer reinforcement member 3a for the outer panel 3 extends over a certain length in the fore-and-aft direction of the door so that the outer surface of the door may have a relatively rigid middle part having a certain length in the fore-and-aft direction and a pair of relatively readily deformable parts adjoining the front and rear ends of the rigid middle pail. Thus, there is a marked difference in the rigidity between the part covered by the outer reinforcement member 3a and the parts not covered thereby. In this embodiment, a middle part of the outer reinforcement member 3a is outwardly recessed as indicated by letter C.

The inner reinforcement member 4a for the inner panel 4 is bent relatively sharply at upper and lower parts thereof as illustrated in FIG. 1, and is made of sheet metal stock having a relatively large thickness. The inner reinforcement member 4a is therefore relatively rigid against external side impacts. The part of the inner panel 4 opposing the inner reinforcement member a is curved relatively gradually, defining a relatively large radius of curvature, and is made of a relatively thin sheet metal stock. Thus, the inner panel 4 is made relatively readily deformable against internal impacts. This part of the inner panel 4 opposing the inner reinforcement member 4a is covered by a cushion pad 8 and an inner surface skin 9 which are both made of suitable synthetic resin materials.

Figure 3:
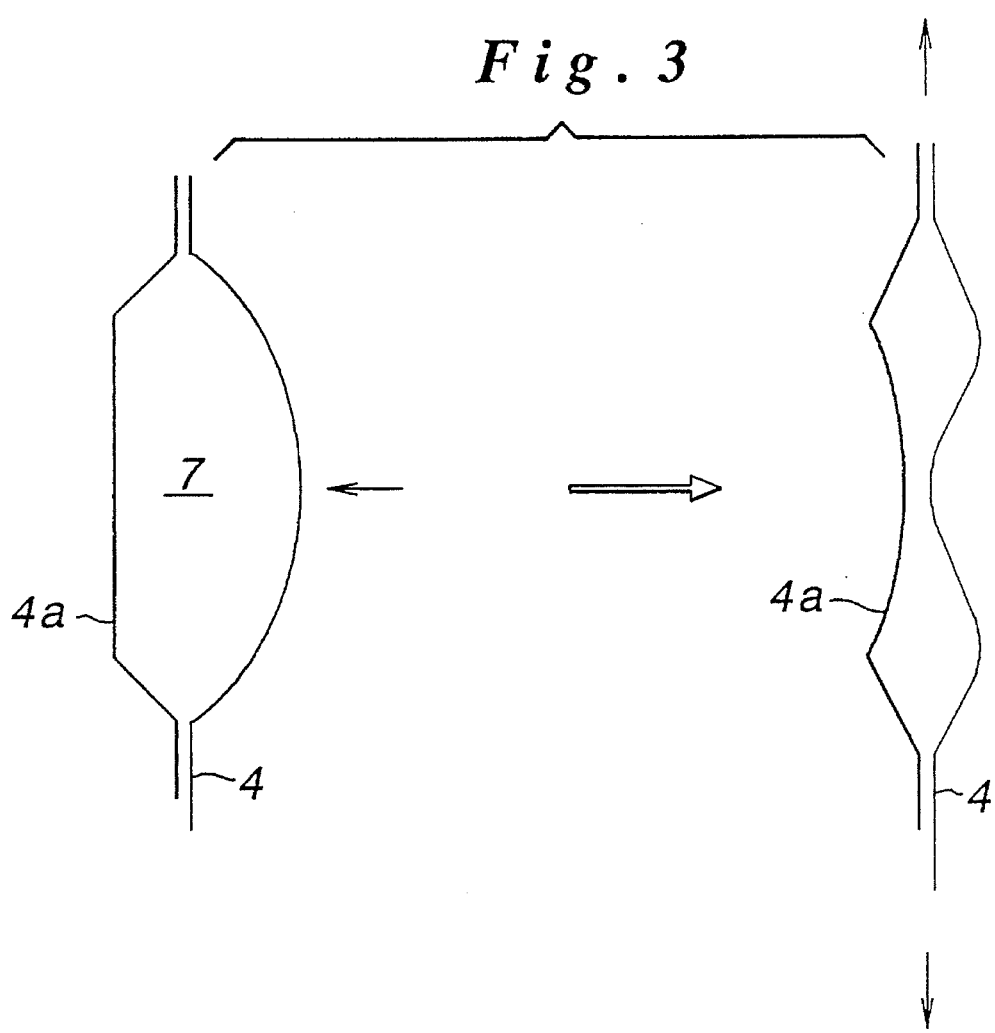
FIG. 3 is a simplified diagram showing the mode of deformation of the door assembly according to the present invention subjected to an internal side impact.

The vertical dimensions of the inner reinforcement member 4a and the corresponding part of the inner panel 4 jointly defining the closed cross section 7 are substantially the same in their developed conditions (i.e., when they are each extended into a flat condition). Therefore, when an internal side impact is applied to the inner panel 4, the closed cross section 7 collapses and the entire closed section is elongated in the vertical direction as illustrated in FIG. 3. Thus, a part of the energy of the internal side impact is converted into the vertical elongation of the entire closed section 7. This effect is particularly enhanced according to this embodiment in which the reinforcement member has a relatively large thickness so as to be rigid against external side impacts but is relatively sharply bent so as to be relatively readily extendible vertically. Therefore, even though the thickness of the reinforcement member and the inner panel are different, it is possible to make the closed cross section extend vertically when the inner panel is subjected to an internal side impact.

Figure 4:
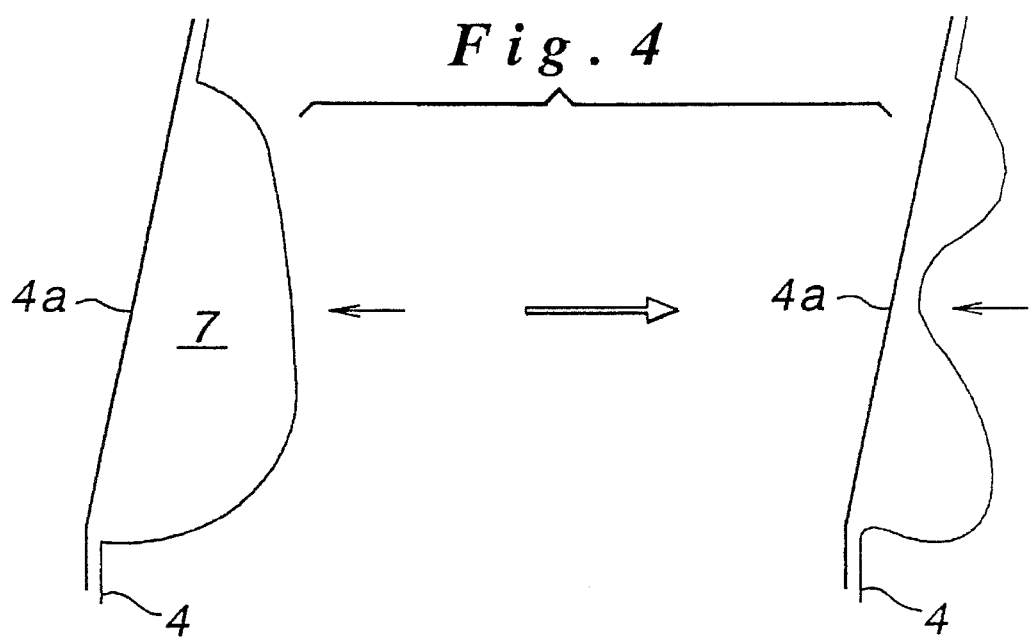
FIG. 4 is a view similar to FIG. 3 showing the mode of deformation of the conventional door assembly subjected to an internal side impact.

On the other hand, according to the conventional structure, the reinforcement member consists of a flat sheet metal member, and only the inner panel is curved so as to define the closed section. Therefore, when the inner panel is subjected to an inner side impact, the inner reinforcement member 4a does not undergo almost any deformation while the inner panel is subjected to a highly complex stress condition involving a buckling deformation as illustrated in FIG. 4. As a result, the relationship between the side load applied to the inner panel and the deformation of the inner panel tends to be highly non-linear, and it is highly difficult to absorb large impact energy for a given lateral deformation. In other words, according to the conventional structure, the door has to have a relatively large thickness and accommodate a large deformation of the inner panel in order to absorb a given amount of impact energy.

With regard to external impacts, the reinforcement member according to the present invention can spread the external side impact over a large area, and it is therefore possible to absorb a large amount of impact energy without involving a large deformation.

Thus, according to the present invention, the automotive door demonstrates a relatively high rigidity against external side impacts, and can spread the impact energy over a large area, thereby involving a relatively small deformation. On the other hand, the door can readily deform itself against internal side impacts, and a relative large amount of impact energy can be absorbed again without involving a large lateral deformation because the collapsing and the vertical extension of the closed cross section formed by the inner panel and the associated inner reinforcement member allows a large amount of energy to be absorbed. Thus, the door assembly of the present invention can favorably absorb impact energy without regard to the direction of the side impact without increasing the overall thickness of the door and by using a highly simple and economical structure.

Although the present invention has been described in terms of a preferred embodiment thereof, it is obvious to a person skilled in the art that various alterations and modifications are possible without departing from the scope of the present invention which is set forth in the appended claims.

What we claim is:

1. An automotive door assembly, comprising:

an outer panel;

an inner panel opposing said outer panel, said inner panel presenting a concave surface toward said outer panel as seen in vertical cross section; and an inner reinforcement means, made of a plate member attached to an internal surface of said inner panel, for presenting a mutually concave surface toward said inner panel as seen in vertical cross section so as to jointly define a closed vertical cross section with said inner panel, said inner panel being more readily deformable than said inner reinforcement means so that upon receiving impact force from said vehicle occupant in a side collision, lateral deceleration or lateral acceleration situation, said inner panel extends in a direction parallel to a longitudinal direction of said inner panel to apply a tensile force to said inner reinforcement means to stretch said inner reinforcement means into a more straightened condition.

2. The automotive door assembly according to claim 1, wherein said inner reinforcement means is bent relatively sharply at upper and lower parts thereof so as to define said concave surface thereof while said inner panel is curved by a relatively large radius of curvature to define said concave surface thereof.

3. The automotive door assembly according to claim 2, wherein said inner reinforcement means has a larger thickness than said inner panel.

4. The automotive door assembly according to claim 3, wherein parts of said inner reinforcement means and said inner panel defining said closed vertical cross section have a substantially identical vertical dimension in developed states thereof.

5. The automotive door assembly according to claim 2, wherein a window pane is guided along a vertical path between said outer panel and said inner reinforcement means, and a part of said inner reinforcement means extending between said upper and lower sharply bent parts defines a relatively flat surface extending substantially in parallel with said vertical path of said window pane.

6. The automotive door assembly according to claim 1, wherein an inner surface of said inner panel is covered by a layer of cushioning material.

7. The automotive door assembly according to claim 1, wherein said outer panel is reinforced by an outer reinforcement member.

\* \* \* \* \*